3,179,648
OLEFIN POLYMERIZATION IN PRESENCE OF PURIFIED CARBON BLACK

Salvatore A. Casale, Morris Township, Morris County, Thomas M. Cawthon, Jr., Rockaway, and George G. Joris, Madison, N.J., and John Ross Tuttle, Brussels, Belgium, assignors to Allied Chemical Corporation, New York, N.Y., a corporation of New York
No Drawing. Filed Feb. 9, 1960, Ser. No. 7,534
3 Claims. (Cl. 260—94.9)

This invention relates to polymerization of alpha-unsaturated olefinic hydrocarbons, especially alpha monoolefinic hydrocarbons in presence of carbon black whereby a solid polymer with carbon black dispersed therein is obtained.

Solid olefin polymers having carbon black dispersed therein are particularly useful in articles which may be exposed to deteriorating effects of illumination, e.g. pipes, wire and cable coverings, films, tapes, filaments, etc.

A dispersion of carbon black in a solid thermoplastic polymer such as a solid olefin polymer can generally be formed by a suitable mixing or milling operation or the like, but such operation may be troublesome and costly if the solid polymer has high viscosity. Since valuable properties of thermoplastic polymers such as tensile strength, cracking resistance, etc. generally improve as the polymer viscosity increases, those thermoplastic polymers having the best physical properties tend to give the most trouble in conventional operations for dispersing carbon black therein.

A way around this difficulty would appear to be to incorporate the carbon black in the polymerization reaction mixture; and it has been proposed to polymerize specifically the normally gaseous mono-olefins over supported catalysts using, among suggested supports, high surface area, non-porous supports including specifically carbon black.

However, so far as we are aware polymerization of an olefin to a solid polymer in presence of carbon black has not heretofore been practiced to yield directly a satisfactory olefin polymer/carbon black composition. Apparently carbon black as support poisons the catalyst materials with which heretofore it has been proposed to impregnate the support, so that only low productivity of polymer has been obtainable in procedures heretofore proposed, less than 5 grams of solid polyethylene per gram of impregnated carbon black.

A known procedure for polymerizing olefinic hydrocarbons, having a degree of pertinence to the present invention, is to polymerize the $C_2$–$C_8$ alpha monoolefins, styrene, etc. by action of chromyl chloride alone or in combination with a strong reducing agent from a Group I–Group III metal, i.e. such metal per se or hydride thereof or organo compound of such metal having strong reducing properties such as a metal alkyl, etc.

We have now found that solid thermoplastic polymers of excellent physical properties, containing carbon black dispersed therein in minor proportions, such as preferably about 1%–10% by weight of the total composition, can be directly obtained by polymerizing an alpha unsaturated olefinic hydrocarbon in presence of carbon black incorporated in the polymerization reaction mixture, when poisons are removed from said carbon black and the carbon black is impregnated with a chromyl compound, especially chromyl chloride.

Various methods are suitable for removing poisons from the carbon black and thereby activating it. One method is to evaporate the poisons by heating the carbon black at elevated temperatures such as 400° C. in a stream of inert gas such as oxygen-free dry nitrogen. Another method relying on intensive evaporation of poisons is to form a slurry of the carbon black in a water-immiscible liquid such as a saturated hydrocarbon and distill off liquid from the slurry whereby poisons are evaporated and removed. This procedure has the special advantage that the carbon black is continuously protected by liquid, which eventually is poison free, from further poisoning. Poisons can also be removed, at least in part, by extraction into wash liquid and/or reaction with a treating agent, e.g. sodium metal, to form an innocuous reaction product.

Chromyl compounds, as the term is used herein, are those compounds of chromium having the general formula $CrO_2A_2$ where "A" is a univalent acid radical. The known chromyl compounds include the fluoride, the chloride, the bromide, the nitrate, and the cyanate (or isocyanate). Any of these chromyl compounds, and mixtures thereof, can be used for our broad purpose; however the results obtained with different chromyl compounds will not necessarily be closely similar under given conditions. Chromyl chloride is preferred as being the most readily available of the chromyl compounds and as giving excellent rates and yields, and excellent properties in the resulting polymers.

We prefer in operations in accordance with our invention to maintain present a hydrocarbon liquid phase. Such hydrocarbon liquid can have the double effect of dissipating heat of reaction and of activating the chromyl compound catalyst by complex formation therewith. This liquid can be saturated, aromatic or olefinic. It can contain substituents which are inert or have only a minor effect on the reaction such as chloro, fluoro, etc. An olefinic liquid, when used, can participate in the polymerization reaction to produce homopolymers of the liquid olefin or copolymers of the liquid olefin with another added olefin. Iso-octane and octene-1 are typical of the liquids which can be used.

Also a chromyl compound such as chromyl chloride per se, upon carbon black support, is operative to polymerize olefinic hydrocarbons we prefer, because of the greater activity and higher molecular weights generally obtained, to bring the supported chromyl compounds into a reduced form for use in our process. One means of obtaining our preferred catalyst is to expose the supported chromyl compound, before and/or during the polymerization, to a strong reducing agent from a Group I–Group III metal such as an alumino hydrocarbon permissibly containing, besides hydrocarbon radicals, other radicals attached to the aluminum atom such as hydrogen, chlorine, etc. Examples include aluminum triisobutyl, aluminum diisobutyl hydride, ethyl aluminum sesquichloride, etc. An alkali metal alkyl can be used as reducing agent e.g. butyl lithium, amyl sodium, etc.; also alkali metal hydrides. Moreover the desired reduction can be obtained by preliminary action of a hydrocarbon at somewhat elevated temperatures, e.g. by exposing the impregnated carbon black to butane at 100°–200° C.

It is not required in our process that the chromyl compound on carbon black be used as the exclusive reducible catalyst, but other reducible catalysts can also be present. The second reducible catalyst, supported or not, can be a chromyl or vanadyl compound; a Group IV–VI metal halide; a supported chromium or vanadium oxide wherein the metal is at least quadrivalent; or a supported chromate. These various catalysts will not necessarily, however, produce equivalent results.

By suitable choice of a second reducible catalyst, the molecular weight and/or other properties of the polymer obtained can be varied. Specifically by including in the polymerization reaction mixture a minor proportion, compared to the carbon black, of chromyl chloride-impregnated silica catalyst, it is possible to produce ethylene polymer under given conditions having broader molecular weight distribution and lower molecular weight than obtained in absence of the impregnated silica catalyst. As silica support for such catalyst there can be used in general those forms of silica having surface area, as usually measured (BET method) of at least 50 sq. meters per gram, such as pigment grade silica; silica gel (preferably of relatively large pore diameter, at least about 50 A.); synthetic silica-alumina gel containing a major proportion of silica; etc.

Olefins which can be polymerized (homopolymerized and/or copolymerized) using the process of our invention include ethylene, propylene, butene-1, pentene-1, 4-methylpentene-1, hexene-1, octene-1, styrene, butadiene, etc.

The following examples describe completely specific embodiments illustrative of our invention and of the best mode contemplated by us for carrying out our invention. However, the invention is not to be understood as limited to all details of the examples.

Carbon black produced by Columbian Carbon Company, No. 999, was employed in the examples below and is typical of carbon black suitable for our purpose. This carbon black is especially recommended for use in plastics as an ultraviolet screening agent. It has the following characteristics according to the manufacturer's bulletin S-27-2922:

It is an impingement black, of the "color black" class, having Blackness Index 175 (i.e. about medium for a color black); Particle Diameter (arithmetic mean) of 13 millimicrons; Surface Area (nitrogen adsorption, BET Method) of 280 sq. meters per gram; Oil Absorption (Venuto Method) of 176 U.S. gals. per 100 lbs.; Tinting Strength Index of 102 (i.e. high); DPG Adsorption Index of 41 (indicating low total surface activity for a "color black"); pH of 3.9 (low acidity for a "color black"); Analysis (moisture free) of 95% fixed carbon, 5% volatile matter.

The ethylene employed in the examples had the following specifications:

Purity—at least 99.7% by weight.
Dewpoint—below −60° C. as measured by cooling a mirror surface with Dry Ice/isopropanol mixture and observing the temperature of the mirror at which a frost forms thereon when an ethylene gas stream is directed against the mirror.
Oxygen content—below 20 parts per million by weight measured suitably by a standard potentiometric method.
Acetylene content—below 150 parts per million by weight.
Carbon dioxide content—below 100 parts per million by weight.
Carbon monoxide content—below 100 parts per million by weight.

The sum total of noxious impurities in the ethylene can generally be measured by a standard colorimetric method, e.g. by reaction with sodium benzophenone, and suitably is no more than 200 parts per million by weight calculated as oxygen.

The ethylene was purified just before use by passage through a column of silica gel (Davison G-62) impregnated with sodium (about 20% by weight).

The chromyl chloride employed in the examples had the following specifications:

| | Percent |
|---|---|
| $CrO_2Cl_2$ minimum | 98 |
| Sulfate as $SO_4$ maximum | 1.0 |
| Free chlorine do | 0.4 |

Molecular weights, when stated in the examples, are weight average molecular weights calculated along the lines employed by Harris, Journal of Polymer Science, vol. VIII of 1952, pages 353–364. Reduced viscosities ($V_{Red}$, i.e. specific viscosity÷concentration) of the polymer were determined in Decalin at 135° C. and concentration ($c$) of 0.05 gram of polymer per 100 ml. of solution. Intrinsic viscosities, $V_{Intr.}$, were calculated by the formula: $V_{Red} = V_{Intr.} + 0.7(V_{Intr.})c^2$. Weight average molecular weights (M.W.) were then calculated by the formula: $V_{Intr.} = 6.77 \times 10^{-4}$ (M.W.)$^{0.67}$.

EXAMPLE 1

Two grams of Columbian No. 999 carbon black slurried in benzene under nitrogen was activated by distilling off 150 ml. of benzene in 6 cuts over a period of 1.3 hours. When the slurry had cooled to 34° C. under nitrogen, 0.05 ml. of chromyl chloride and 0.6 g. of aluminum triisobutyl (as 3 ml. of 0.2 g./ml. isooctane solution) were added to the slurry. The nitrogen atmosphere was displaced with ethylene and after 48 minutes 0.4 g. of aluminum triisobutyl (as 2 ml. of 0.2 g./ml. isooctane solution) was added to the slurry. Over a period of 6.3 hours ethylene was supplied at atmospheric pressure, with temperature between 29° and 44° C.

The resulting slurry was filtered and the product was dried. It weighed 21 grams, representing 19 grams of solid polymer of ethylene, formed at an average rate of 1.5 grams per gram of carbon black per hour. The polyethylene product had a viscosity average molecular weight of $2.0 \times 10^6$, as calculated from its reduced viscosity of 15.8 dcl./gm. The content of carbon black in the total product was 9.5% by weight.

EXAMPLE 2

(a) Two grams of Columbian No. 999 carbon black slurried in 200 ml. of benzene under nitrogen was activated by distilling off 100 ml. of benzene in 4 cuts over a period of 40 minutes. After cooling to room temperature under nitrogen, .02 ml. of chromyl chloride was added to the slurry with mixing. The slurry was then heated to reflux temperature and 50 ml. of benzene was distilled off in 20 minutes. When the slurry had cooled to room temperature, 100 ml. of octene-1 and 5 ml. of aluminum triisobutyl solution (0.2 g./ml.) in isooctane was added to the slurry under nitrogen. The reactor was then flushed with ethylene at one atmosphere pressure and an average rate of polymerization of 1.5 grams per gram of carbon black per hour was obtained at temperatures between 26 and 38° C. over a period of 6.75 hours. The ethylene/octene-1 copolymer had a viscosity average molecular weight of $5.1 \times 10^5$, as calculated from its reduced viscosity of 5.18 dcl./gm. The carbon black content was 9% by weight based on total product.

(b) In a similar experiment ethylene was copolymerized with hexene-1 at an average rate of 0.86 gram of ethylene per gram of carbon black per hour.

EXAMPLE 3

(a) Two grams of Columbian No. 999 carbon black slurried in 200 ml. of benzene under nitrogen was heated to reflux temperature and 100 ml. of benzene was distilled off in 40 minutes. When the slurry had cooled to room temperature under nitrogen, .02 ml. of chromyl chloride was added to the agitated slurry. The slurry was heated to reflux temperature and 50 ml. of benzene was distilled off in 20 minutes. When the slurry had again cooled to room temperature under nitrogen, 100 ml. of octene-1 and one gram of aluminum triisobutyl in 5 ml. of isooctane solution were added.

The slurry was agitated under nitrogen at room temperature for 18 hours. The octene-1 polymerized at an average rate of 0.25 gram per gram of carbon black per hour. The gummy poly octene-1 had an intrinsic viscosity in Decalin at 135° C. of 1.3 dcl./gm.

(b) In a similar experiment hexene-1 was polymerized at an average rate of 0.24 gram per gram of carbon black per hour. The gummy poly hexene-1 had an intrinsic viscosity in Decalin at 135° C. of 1.9 dcl./gm.

EXAMPLE 4

In runs 1 and 2 tabulated below a slurry was prepared containing 2 grams of carbon black in 400 ml. of purified iso-octane. The iso-octane was purified by distillation under nitrogen from a solution containing aluminum triisobutyl.

Poisons were removed from the carbon black by heating this slurry to boiling and distilling during 2 hours 200 ml. of iso-octane in 8 cuts.

A stream of nitrogen was then passed first over sodium supported on silica gel and then over the azeotroped slurry while the slurry was cooled to room temperature. Then there was added 0.011 gram of chromyl chloride as 0.6 ml. of a 1% by volume solution of chromyl chloride in purified cyclohexane. The cyclohexane used was purified by distillation under nitrogen from a solution containing aluminum triisobutyl.

Into the resulting solution, ethylene purified as specified above was admitted until the solution was saturated at 30° C. Then polymerization was initiated by adding, in amounts differing for runs 1 and 2 as indicated in the table below, a solution of aluminum triisobutyl dissolved in iso-octane purified as above specified, at concentration of 0.05 gram of aluminum triisobutyl per ml. of solution; and bringing the temperature to 60° C. The temperature was maintained at 60° C. and the pressure was maintained at one atmosphere by supplying ethylene for a period of about 18 hours in runs 1 and 2.

In run 3 the carbon black support was activated by heating under a flow of dry, oxygen-free nitrogen for 4 hours at 400° C. After cooling to room temperature, the activated carbon black was slurried under nitrogen with 200 ml. of purified iso-octane. The slurry was mixed with 0.011 gram of chromyl chloride as 0.6 ml. of a 1% by volume solution of chromyl chloride in purified cyclohexane.

The slurry was saturated at 30° C. with ethylene and polymerization was initiated by the addition of 0.27 g. of aluminum triisobutyl as 5.4 ml. of its iso-octane solution. The temperature was increased to 60° C. Ethylene was added to maintain a pressure of one atmosphere and the polymerization was continued at 60° C. for 13.6 hours. The results are tabulated below.

In run 4, 8.3 ml. of iso-octane per gram of carbon black was distilled at a reflux ratio of about 5 to 1 over a period of 10 hours from a slurry of 100 g. of carbon black in 2000 ml. of iso-octane. After cooling to room temperature under nitrogen, the carbon black support was impregnated with chromyl chloride by passing nitrogen containing about 20 mm. partial pressure of chromyl chloride through the agitated slurry for 20 minutes. Twenty-five ml. of the slurry containing 2.5 g. of catalyst was added to 100 ml. of purified iso-octane under nitrogen.

After the slurry had been saturated with ethylene at room temperature, 8 ml. of an iso-octane solution containing 0.4 g. of aluminum triisobutyl was added to initiate polymerization. The temperature was then increased to 50° C. and ethylene was supplied at one atmosphere pressure for 12.5 hours. The resulting ethylene polymer had a viscosity average molecular weight of $2.7 \times 10^6$, calculated as above, a yield strength of 2,940 p.s.i., an ultimate tensile strength of 5,120 p.s.i. and an ultimate elongation of 347%.

*Table*

| Run No. | Weight Percent of Chromium on Carbon Black | Weight Ratio, Carbon Black: Aluminum Triisobutyl | Average Rate of Solid Polymer Production in grams Polymer/gram Carbon Black/hour | Weight Ratio of Solid Polymer Formed: Carbon Black |
|---|---|---|---|---|
| 1 | 0.2% Cr | 22 | 1.0 | 18 |
| 2 | 0.2% Cr | 7 | 1.5 | 28 |
| 3 | 0.2% Cr | 7.4 | 1.1 | 15 |
| 4 | 0.3% Cr | 6.3 | 2.8 | 35 |

Among factors which influence the reaction rate and/or influence properties of the polymers obtained in the above examples are temperature; olefin concentrations in the liquid phase of the slurry; reducible catalyst:reducing agent mol ratios; length of time that the carbon black impregnated with chromyl chloride has stood in contact with the hydrocarbon liquid phase before polymerization is initiated. In general higher temperatures give faster rates and lower molecular weights; but when temperatures are too high the rate and yield may drop as a result of plastic polymer encapsulating the catalyst particles rather than accumulating thereon in a porous solid form.

Higher olefin concentrations give higher rates, which are highest when the olefin contacts the catalyst directly rather than in solution; but if rates become too high the temperature cannot be controlled.

At a particular range of reducible catalyst:reducing agent mol ratios, differing for the different catalysts and more or less sharp when using different hydrocarbons as liquid phase, a minimum molecular weight of the polymer produced under otherwise given conditions is observed.

Especially when the ratio of supported catalyst:aluminum triisobutyl is relatively high, it is observed that supported chromyl catalyst which has stood in contact with liquid hydrocarbon for a few days gives higher rates than freshly prepared supported chromyl catalyst. It is known that chromyl chloride forms addition compounds with saturated, with aromatic, and with olefinic hydrocarbons upon standing. Such compound formation may be involved in the present catalysis.

As shown in the examples above, the polymers such as ethylene homopolymers produced by our process above described have molecular weights of the order of one million. These molecular weights can be reduced, if desired, by heating, especially by heating while subjecting the polymer to shear forces as in an extruder fitted with a mixing head or the like.

We claim:
1. In a process of polymerizing an alpha unsaturated olefin hydrocarbon comprising ethylene in presence of carbon black to form directly a composition of olefin polymer and minor proportions of carbon black, the improvement which comprises: employing carbon black of the "color black" class; removing poisons from said carbon black by distilling off liquid hydrocarbon from a slurry of the carbon black in a liquid hydrocarbon; impregnating the carbon black thus freed of poisons with chromyl chloride by introducing chromyl chloride into the said carbon black slurry freed of poisons; bringing the chromyl chloride into a reduced form by exposure to an alumino hydrocarbon; contacting said olefinic hydrocarbon with said supported and reduced chromyl chloride in said slurry under polymerization conditions; and maintaining polymerization conditions until the resulting composition of olefin polymer and carbon black contains about 1%–10% by weight of carbon black.

2. Process as defined in claim 1, wherein the strong reducing agent is aluminum triisobutyl.

3. Process as defined in claim 1 wherein the chromyl chloride is introduced into the carbon black slurry by passing nitrogen gas admixed with chromyl chloride vapor through the slurry and wherein the weight percent of chromium in the impregnated carbon black is about 0.3 percent.

References Cited by the Examiner
UNITED STATES PATENTS 2,910,461  10/59  Nowlin _____ 260—94.9
2,981,725  4/61   Luft et al. _____ 260—94.9
3,008,949  11/61  Langer et al. _____ 260—94.9

OTHER REFERENCES

"Catalysis" (Emmett), published by Reinhold Corp. (New York), 1954, pages 247–249 and 259.

JOSEPH L. SCHOFER, *Primary Examiner.*

L. H. GASTON, M. LIEBMAN, J. R. LIBERMAN, WILLIAM H. SHORT, *Examiners.*